Dec. 15, 1942. H. F. CYPSER 2,305,378
OPERATING CIRCUIT FOR ELECTRICAL DEVICES
Filed June 21, 1940
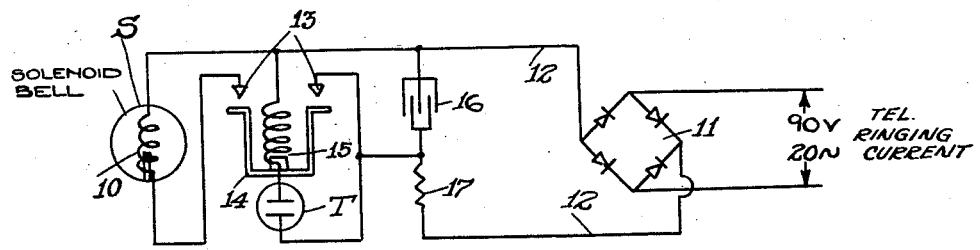
Inventor:
Hugo F. Cypser
By Owen N. Kennedy
Attorney Patented Dec. 15, 1942

2,305,378

UNITED STATES PATENT OFFICE 2,305,378

OPERATING CIRCUIT FOR ELECTRICAL DEVICES

Hugo F. Cypser, New York, N. Y., assignor to Signal Engineering & Manufacturing Company, New York, N. Y., a corporation of Massachusetts Application June 21, 1940, Serial No. 341,739

7 Claims. (Cl. 179—84)

The present invention relates to an operating circuit for electrical devices, such as various types of signals or relays that are responsive to the transmission of current impulses from a suitable source.

According to the invention, there is provided a circuit whereby an electrical load device, such as a signal, can be caused to operate intermittently with a definite timing, entirely determined by the electrical characteristics of the circuit and without the utilization of any mechanically operated circuit interrupting devices. The circuit of the present invention is also adapted to cause the functioning of a signal or other device, with its current requirements from the energizing power source reduced to an extremely low value, as compared to the current normally required to operate the same device, without utilizing my improved circuit.

The above and other advantageous features of the invention will hereinafter more fully appear from the following description considered in connection with the single figure of the accompanying drawing, which is a diagram of an electrical circuit embodying the invention.

Referring to the drawing, the circuit of the present invention is shown, for purposes of illustration, as being utilized to operate a signal S of the single-stroke solenoid type. The signal comprises a winding 10, with which is associated a magnetic plunger adapted to be drawn within the winding when the latter is energized to hit a suitable resonant member a single stroke. For the purpose of energizing the winding 10, the electrical power source utilized is indicated as being that employed in a telephone ringing circuit, namely, 90 volts, 20 cycles. The source is connected to a full wave rectifier 11, so as to supply direct current to the mains 12. The signal S has one terminal of its winding 10 connected to one main 12, while its other terminal is connected to one of a pair of spaced stationary contacts 13, forming part of a relay, in which the bridging member 14 is out of engagement with the contacts 13 when the relay winding 15 is in a deenergized condition.

A condenser 16 is connected across the mains 12, and one terminal of the condenser is also connected to the other stationary relay contact 13. Consequently, engagement of the relay contacts 13 by the bridging member 14 in response to energization of the winding 15, will connect the signal winding 10 directly across the terminals of the condenser 16. The circuit also includes a two-electrode gas filled tube T, connected in series with the relay winding 15, the tube T being of the cold cathode type, such as an ordinary neon tube, and being adapted to break down at a predetermined voltage.

When the 90 volt, 20 cycle source is applied to the input side of the rectifier 11, its output side begins to charge the condenser 16 through a resistor 17, at which moment the voltage across the terminals of the tube T is substantially zero. As the condenser 16 charges, the potential across the tube gradually increases, and when this potential reaches a predetermined value, the tube will break down so as to pass current and thereby energize the relay winding 15. The resulting engagement of the contacts 13 by the bridging member 14, connects the charged condenser 16 directly across the terminals of the signal winding 10, whereupon the signal is operated by the discharge of the condenser 16.

When the condenser 16 has completely discharged into the signal winding 10, the voltage across the tube T falls to such a low value that the tube no longer passes current, whereupon the relay drops back to open the contacts 13, thereby removing the winding 10 from across the condenser terminals. The condenser 16 then begins to charge again, to cause the previously described operating cycle to repeat itself, by energizing the signal winding when the relay again pulls up, in response to breaking down of the tube. Therefore, as long as the 90 volt, 20 cycle source is applied to the rectifier 11, the signal will continue to give recurring strokes. Furthermore, when the ringing current source is applied to the rectifier intermittently, in accordance with the usual operation of a telephone ringing machine, which is generally two seconds "on" and four seconds "off," the signal S will operate at least once while the ringing current is on. This is due to the fact that the condenser will charge and discharge at least once during a two second interval. In the functioning of the circuit, it has been found that the tube T is effective to prevent pull up of the relay until after the condenser 16 has been charged sufficiently to fully energize the signal S on discharge.

Some idea of the relations that exist in the circuit described above may be obtained from a comparison between the operation of the signal S connected directly across the supply mains, and operation of the same signal from the same supply mains, but under the control of the condenser, relay and tube combination. Assuming that this particular signal will draw one ampere at 100 volts, flowing .01 second, it is evident that it is only necessary for the condenser 16 to charge at the rate of .01 ampere through one second, in order to store up the necessary energy to operate this signal on discharge of the condenser. In other words, a very large number of condenser controlled signals can be operated from a line of low current carrying capacity, at a given voltage, and for the same reason, one signal could be operated at the end of a line miles in length, so far removed from the voltage source that only a very small current is available at the location of the signal. Thus, a standard loud ringing bell, such as is usually operated from 110 volt supply mains, can be energized from rectified telephone ringing current at a point far removed from the central station, due to the fact that an extremely low current is required to charge the condenser which operates the bell.

From the foregoing, it is apparent that by the present invention there is provided an improved operating circuit for electrical load devices, whereby a signal requiring an operating current greater than the current available from a source of the character that is employed for telephone ringing current, can be operated through energy automatically stored in a condenser, at least once for each application of the ringing current.

I claim:

1. An operating circuit for electrical devices, comprising in combination, a source of unidirectional current, an electrical load device, a condenser, means for connecting said condenser across said source until fully charged, and means dependent upon the degree of condenser charge for automatically connecting said device across the terminals of the charged condenser to operate the same.

2. An operating circuit for electrical devices, comprising in combination, a source of unidirectional current, an electrical load device, a condenser, and a relay adapted to be included in circuit with said source for automatically connecting said device across the terminals of said condenser whenever said condenser receives a predetermined degree of charge from said source.

3. An operating circuit for electrical devices, comprising in combination, source of unidirectional current, an electrical load device, a condenser adapted to be charged from said source, a relay adapted to cause the connection or disconnection of said device across the terminals of said condenser and the operation of said load device when said condenser is fully charged, and means dependent upon the degree of condenser charge for causing energization of said relay.

4. An operating circuit for electrical devices, comprising in combination, a source of unidirectional current, an electrical load device, a condenser adapted to be charged from said source, a relay providing relatively movable contacts in circuit with said device for connecting said device across the terminals of said condenser and means for preventing operation of said relay until said condenser is fully charged.

5. An operating circuit for electrical devices, comprising in combination, a source of unidirectional current of low potential power output, an electrical device requiring an operating current greater than the current available from said source at the point of installation of said device, a condenser associated with said device, means for charging said condenser from said source, at a rate determined by the current available, and means comprising a relay device and associated discharge tube for automatically discharging said condenser into said device when the charge stored in said condenser is sufficient to operate said device.

6. An operating circuit for electrical devices, comprising in combination, a source of electrical energy of the character that is employed for telephone ringing current, means for rectifying successive applications of said ringing current into unidirectional current, an electrically operated signal of the type usually requiring energization from a commercial current source, and means associated with said signal for storing unidirectional current for the duration of a normal application of said ringing current, and for discharging the stored energy of the rectified current to cause the operation of said signal at least once for each application of said ringing current.

7. An operating circuit for electrical devices, comprising in combination, a source of electrical energy of the character that is employed for telephone ringing current, means for rectifying successive applications of said ringing current into unidirectional current, an electrically operated signal of the type usually requiring energization from a commercial current source, a condenser for receiving a charge of unidirectional current in response to each application of ringing current, and means for automatically utilizing the stored energy of the charged condenser to operate said signal at least once during each application of ringing current.

HUGO F. CYPSER.